(12) United States Patent
Palenstyn et al.

(10) Patent No.: US 7,500,381 B2
(45) Date of Patent: Mar. 10, 2009

(54) SYSTEMS AND METHODS FOR TRACE GAS LEAK DETECTION OF LARGE LEAKS AT RELATIVELY HIGH TEST PRESSURES

(75) Inventors: Pieter Palenstyn, Plympton, MA (US); Charles Perkins, Boston, MA (US)

(73) Assignee: Varian, Inc., Palo Alto, CA (US)

( * ) Notice: Subject to any disclaimer, the term of this patent is extended or adjusted under 35 U.S.C. 154(b) by 221 days.

(21) Appl. No.: 11/513,716

(22) Filed: Aug. 31, 2006

(65) Prior Publication Data
US 2008/0053199 A1   Mar. 6, 2008

(51) Int. Cl.
*G01M 3/04* (2006.01)

(52) U.S. Cl. .......................... 73/40.7; 73/49.2; 73/49.3; 62/228.3

(58) Field of Classification Search .............. 73/40–49.8
See application file for complete search history.

(56) References Cited

U.S. PATENT DOCUMENTS

| | | | |
|---|---|---|---|
| 3,690,151 A | 9/1972 | Briggs | |
| 4,472,962 A | 9/1984 | Mennenga | |
| 4,735,084 A * | 4/1988 | Fruzzetti | 73/40.7 |
| 4,845,360 A | 7/1989 | Landfors | |
| 5,238,362 A | 8/1993 | Casaro et al. | |
| 5,538,373 A | 7/1996 | Kirkham | |
| 5,542,828 A * | 8/1996 | Grenci et al. | 418/1 |
| 5,907,092 A * | 5/1999 | Bohm | 73/40.7 |
| 5,932,797 A | 8/1999 | Myneni | |
| 6,336,356 B1 * | 1/2002 | Paquet et al. | 73/40.7 |
| 6,415,650 B1 * | 7/2002 | Bohm et al. | 73/40.7 |
| 7,082,813 B2 * | 8/2006 | Grosse-Bley et al. | 73/40.7 |
| 7,204,127 B2 * | 4/2007 | Perkins et al. | 73/40.7 |
| 7,232,297 B2 * | 6/2007 | Beaven et al. | 418/197 |

OTHER PUBLICATIONS

PCT/US2007/018962, PCT International Search Report, mailed Jan. 2, 2008, 4 pages.

* cited by examiner

*Primary Examiner*—Hezron Williams
*Assistant Examiner*—Gunnar J Gissel
(74) *Attorney, Agent, or Firm*—Bella Fishman; William R. McClellan

(57) ABSTRACT

Trace gas leak detectors and methods for trace gas leak detection of large leaks at relatively high test pressures are provided. A trace gas leak detector includes a test port to receive a sample containing a trace gas, the test port connected to a test line, a mass spectrometer to detect the trace gas, a high vacuum pump having an inlet port coupled to the inlet of the mass spectrometer, and a forepump having a main inlet, at least one intermediate inlet and an exhaust. The main inlet of the forepump is coupled to the exhaust port of the high vacuum pump. The intermediate inlet is controllably connected to the test line. The forepump is selected from the group consisting of a scroll vacuum pump and a screw vacuum pump.

17 Claims, 4 Drawing Sheets

SYSTEMS AND METHODS FOR TRACE GAS LEAK DETECTION OF LARGE LEAKS AT RELATIVELY HIGH TEST PRESSURES

FIELD OF THE INVENTION

This invention relates to detection of leaks in sealed articles and, more particularly, to systems and methods for trace gas leak detection of large leaks at relatively high test port pressures. The trace gas is typically helium but is not limited to helium.

BACKGROUND OF THE INVENTION

Helium mass spectrometer leak detection is a well-known leak detection technique. Helium is used as a trace gas, which passes through the smallest of leaks in a sealed test piece. The helium is then drawn into a leak detection instrument and is measured. The quantity of helium corresponds to the leak rate. An important component of the instrument is a mass spectrometer, which detects and measures the helium. The input gas is ionized and mass analyzed by the spectrometer in order to separate the helium component, which is then measured. In one approach, the interior of a test piece is coupled to the test port of the leak detector. Helium is sprayed onto the exterior of the test piece, is drawn inside through a leak and is measured by the leak detector.

One of the requirements of the mass spectrometer is that the inlet through which the helium and other gases are received be maintained at a relatively low pressure, typically below $2 \times 10^{-4}$ Torr. In a conventional leak detector, a vacuum pumping arrangement is utilized to maintain the input of the mass spectrometer at the required pressure. However, since the test port must be maintained at a relatively low pressure during a leak test, the rough pumping cycle is relatively long. Furthermore, in the testing of leaky or large volume parts, which results in a high test port pressure, it may be difficult or impossible to achieve the required pressure level.

In a counterflow leak detector disclosed in the U.S. Pat. No. 3,690,151, issued Sep. 12, 1972 to Briggs, the mass spectrometer tube is connected to the inlet of a diffusion pump and the helium trace gas is introduced through the foreline, or exhaust port, of the diffusion pump. The diffusion pump exhibits a high pressure ratio for heavier gases, but a low pressure ratio for lighter gases such as helium. Therefore, helium diffuses at an acceptable rate in a reverse direction through the diffusion pump to the mass spectrometer and is measured. Heavier gases in the sample are to a large degree blocked by the diffusion pump and prevented from reaching the mass spectrometer. Due to the method of reverse flow in the diffusion pump, the leak detector test port can be operated at a much higher operating pressure, typically 100 millitorr.

A test port pressure of 100 millitorr is satisfactory for many leak test applications. However, it is desirable in some applications to perform leak tests on very large or leaky parts where this test port pressure cannot be attained. In another prior art arrangement, a flow restrictor is positioned between the test port and the foreline of the high vacuum pump. Separate roughing pumps are used to pump the test port and the foreline of the high vacuum pump. This approach permits a higher test port pressure but is more complex and expensive because of the need for two roughing pumps.

Another prior art approach is disclosed in the U.S. Pat. No. 4,735,084, issued Apr. 5, 1998, to Fruzzetti. The trace gas passes in reverse direction through one or two stages of a mechanical vacuum pump, thereby achieving a high test port pressure.

A counterflow leak detector with high and low sensitivity operating modes is disclosed in the U.S. Pat. No. 4,845,360, issued Jul. 4, 1989, to Landfors. A diffusion pump includes a conventional foreline and a second foreline provided with an ejector stage. The leak detector has high and low sensitivity operating modes.

A leak detector which utilizes a turbomolecular vacuum pump having an inlet connected to a gas sensor, an outlet connected to a forepump and an intermediate inlet connected to the test port is disclosed in the U.S. Pat. No. 4,472,962, issued Sep. 25, 1984 to Mennenga.

The U.S. Pat. No. 5,542,828, issued Aug. 6, 1996, to Grenci et al. discloses a system for vacuum pumping a mass spectrometer, which uses a scroll vacuum pump in combination with a high vacuum pump.

None of the prior art arrangements for leak detection of large volume and/or leaky parts at relatively high pressures has been entirely satisfactory. Accordingly, there is a need for new and improved systems and methods for trace gas leak detection of large leaks at relatively high test pressures.

SUMMARY OF THE INVENTION

According to a first aspect of the invention, a trace gas leak detector comprises a test port to receive a sample containing a trace gas, the test port connected to a test line, a mass spectrometer to detect the trace gas, the mass spectrometer having an inlet, a high vacuum pump having an inlet port coupled to the inlet of the mass spectrometer, the high vacuum pump having an exhaust port, and a forepump having a main inlet, at least one intermediate inlet and an exhaust, the main inlet coupled to the exhaust port of the high vacuum pump, and the intermediate inlet controllably connected to the test line. The forepump is selected from the group consisting of a scroll vacuum pump and a screw vacuum pump.

According to another aspect of the invention, a method for trace gas leak detection comprises providing a mass spectrometer to detect the trace gas, the mass spectrometer having an inlet, and a high vacuum pump having an inlet port coupled to the inlet of the mass spectrometer, the high vacuum pump having an exhaust port, providing a forepump having a main inlet, at least one intermediate inlet and an exhaust, the forepump selected from the group consisting of a scroll vacuum pump and a screw vacuum pump, coupling the main inlet of the forepump to the exhaust port of the high vacuum pump, and supplying a sample containing the trace gas to the intermediate inlet, wherein the trace gas moves in reverse direction through the forepump and the high vacuum pump and is detected by the mass spectrometer.

BRIEF DESCRIPTION OF THE DRAWINGS

For a better understanding of the present invention, reference is made to the accompanying drawings, which are incorporated herein by reference and in which.

DETAILED DESCRIPTION OF THE INVENTION

Figure 1:
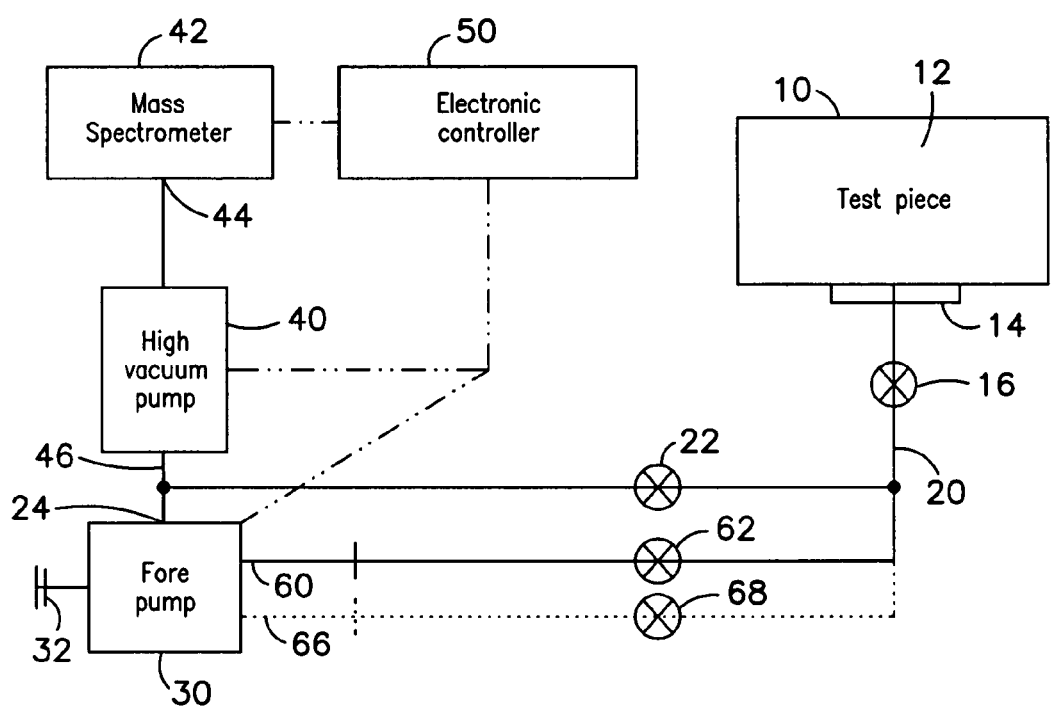
FIG. 1 is a simplified block diagram of a trace gas leak detector in accordance with an embodiment of the invention.

A trace gas leak detector in accordance with an embodiment of the invention is shown in FIG. 1. A test piece 10 having a test volume 12 is attached to an inlet flange 14. Inlet flange 14 defines a test port of the leak detector and is connected through a test valve 16 to a test line 20. Test line 20 is coupled through a roughing valve 22 to a main inlet 24 of a forepump 30. A forepump exhaust 32 may exhaust into atmosphere or into an exhaust conduit. The leak detector further includes a high vacuum pump 40 and a mass spectrometer 42. Mass spectrometer 42 has an inlet 44 coupled to an inlet of high vacuum pump 40. A foreline 46, or exhaust port, of high vacuum pump 40 is coupled to the main inlet 24 of forepump 30 and is coupled through roughing valve 22 to test line 20. An electronic controller 50 controls mass spectrometer 42, high vacuum pump 40, forepump 30 and all valves in the leak detector during operation.

In accordance with an embodiment of the invention, forepump 30 is a scroll vacuum pump or a screw vacuum pump having at least one intermediate inlet 60. Each of these pump types has a working volume that extends from the main inlet to the exhaust. The pressure along the working volume varies more or less continuously from the main inlet to the exhaust. Intermediate inlet 60 is connected to the working volume of forepump 30 at an intermediate location between main inlet 24 and exhaust 32. As a result, intermediate inlet 60 operates at an intermediate pressure between the pressure of main inlet 24 and the pressure of exhaust 32. Thus, in general, intermediate inlet 60 operates at a higher pressure than main inlet 24. Intermediate inlet 60 is coupled through an intermediate valve 62 to test line 20.

Forepump 30 may have one intermediate inlet 60 or may have more than one intermediate inlets to different locations in the working volume between main inlet 24 and exhaust 32. In the embodiment of FIG. 1, forepump 30 optionally includes a second intermediate inlet 66, which is coupled through a second intermediate valve 68 to test line 20.

High vacuum pump 40 may be a turbomolecular pump, a so-called hybrid turbopump, a molecular drag pump or a diffusion pump. In a hybrid turbopump, one or more of the axial pumping stages of the turbomolecular pump are replaced with disks which rotate at high speed and which function as molecular drag stages. This configuration is disclosed in the U.S. Pat. No. 5,238,362, issued Aug. 24, 1993 to Casaro et al. The hybrid turbopump may include additional pumping stages, such as regenerative stages, as described in the U.S. Pat. No. 5,538,373, issued Oct. 25, 1994 to Hablanian. In each case, the vacuum pump is characterized by a relatively high reverse flow rate for light gases, such as helium, and a relatively low reverse flow rate for heavy gases, so that helium passes through the vacuum pump in a reverse direction from foreline 46 to mass spectrometer 42 and other gases are substantially blocked. The reverse flow rate refers to the flow rate in a reverse direction from the foreline of the pump to its inlet.

Figure 2:
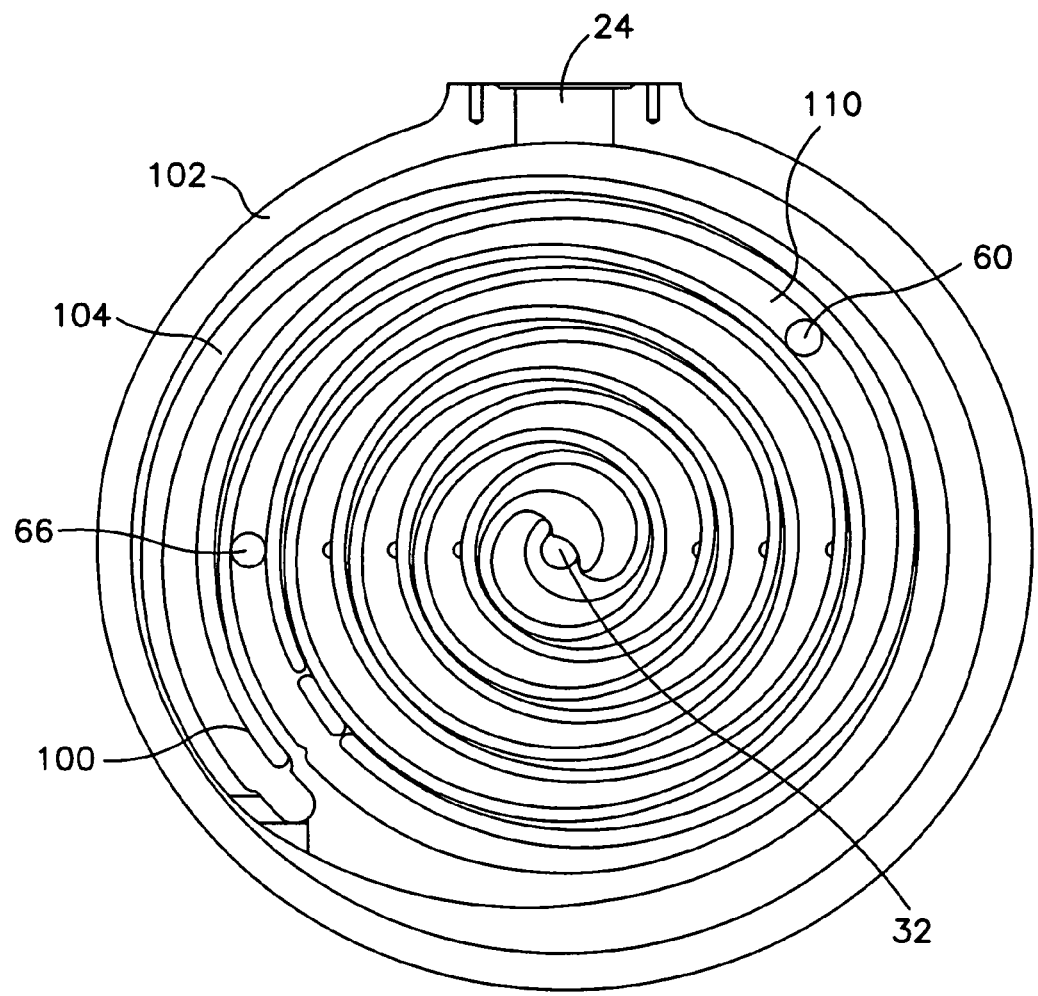
FIG. 2 is a simplified cross-sectional view of a scroll vacuum pump.

A simplified cross-sectional view of a scroll-type vacuum pump, or a scroll pump, suitable for use as forepump 30 in the leak detector of FIG. 1 is shown in FIG. 2. Gas is evacuated from a vacuum chamber or other equipment, such as a leak detector, connected to main inlet 24 of the pump. The pump further includes exhaust 32 for discharge of the gas being pumped. The scroll pump includes a set of intermeshed, spiral-shaped scroll blades. The scroll pump of FIG. 2 includes a stationary scroll blade 100 extending from a stationary scroll plate 102 and an orbiting scroll blade 104 extending from an orbiting scroll plate (not shown). Scroll blades 100 and 104 extend axially toward each other and are intermeshed together to form interblade pockets 110. Orbiting motion of scroll blade 104 relative to scroll blade 100 produces a scroll-type pumping action of gas entering into the interblade pockets 110 between the scroll blades. The interblade pockets 110 move from main inlet 24 toward exhaust 32, thereby pumping gas in the interblade pockets. The interblade pockets 110 constitute the working volume of the scroll vacuum pump. The construction and operation of scroll vacuum pumps is generally known to those skilled in the art.

As further shown in FIG. 2, the scroll vacuum pump is provided with intermediate inlet 60. Intermediate inlet 60 may be implemented as a hole through stationary scroll plate 102 to access the interblade pockets 110. Intermediate inlet 60 may be located at any position between main inlet 24 and exhaust 32 in accordance with the expected pressure in test line 20 during a leak test. Furthermore, optional second intermediate inlet 66 may be positioned as desired along the spiral path between main inlet 24 and exhaust 32. Because of the continuous nature of the pumping path between main inlet 24 and exhaust 32 of the scroll pump, each intermediate inlet can be located over a range of positions, with the position selected according to the expected test line pressure in a particular application.

Figure 3:
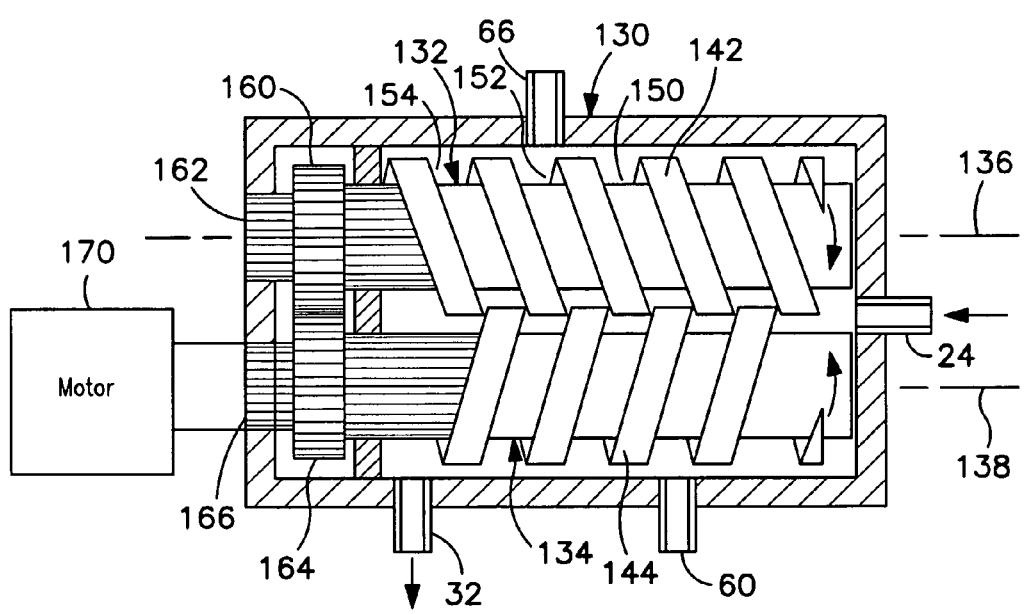
FIG. 3 is a simplified cross-sectional view of a screw vacuum pump.

A simplified cross-sectional view of a screw vacuum pump suitable for use as forepump 30 in the leak detector of FIG. 1 is shown in FIG. 3. An enclosed pump housing 130 is provided with main inlet 24 and exhaust 32. A first screw 132 and a second screw 134 are mounted within housing 130 by suitable bearings (not shown) for rotation about parallel axes 136 and 138, respectively. Screw 132 includes threads 142, and screw 134 includes threads 144. Screws 132 and 134 are positioned in side-by-side relationship within housing 130 such that threads 142 and 144 intermesh. Threads 142 and 144 are spaced slightly from an inside wall of housing 130 to permit unhindered rotation, while minimizing leakage between threads 142, 144 and housing 130. Typical spacings are on the order of a few thousandths of an inch. Intermeshed threads 142 and 144, and housing 130 define a plurality of enclosed cavities 150, 152, 154, etc.

A synchronizing gear 160 is connected by a shaft 162 to screw 132, and a synchronizing gear 164 is connected by a shaft 166 to screw 134. The synchronizing gears 160 and 164 are intermeshed to provide synchronized rotation of screws 132 and 134 about axes 136 and 138, respectively. Shaft 166 is connected to a motor 170. When the motor is energized, screws 132 and 134 rotate in synchronism, so that the threads 142 and 144 remain intermeshed. Motor 60, synchronizing gears 160 and 164, and the connecting shafts constitute a drive mechanism for the vacuum pump.

As further shown in FIG. 3, the screw vacuum pump is provided with intermediate inlet 60. Intermediate inlet 60 may be implemented as a hole through housing 130 to access one of cavities 150, 152, 154, etc. Intermediate inlet 60 may be located at any position between main inlet 24 and exhaust 32 in accordance with the expected pressure in test line 20 during a leak test. Furthermore, optional second intermediate inlet 66 may be positioned as desired along the path between main inlet 24 and exhaust 32. Because of the continuous nature of the pumping path between main inlet 24 and exhaust 32 of the screw pump, each intermediate inlet can be located over a range of positions, with the positions selected according to the expected test line pressure in a particular application.

In operation, motor 170 causes screws 132 and 134 to rotate about axes 136 and 138, respectively, so that the enclosed cavities 150, 152, 154, etc. move from main inlet 24 toward exhaust 32. Gas enters the vacuum pump through main inlet 24 and is carried in the enclosed cavities to exhaust 32, thereby performing gas pumping.

Figure 4:
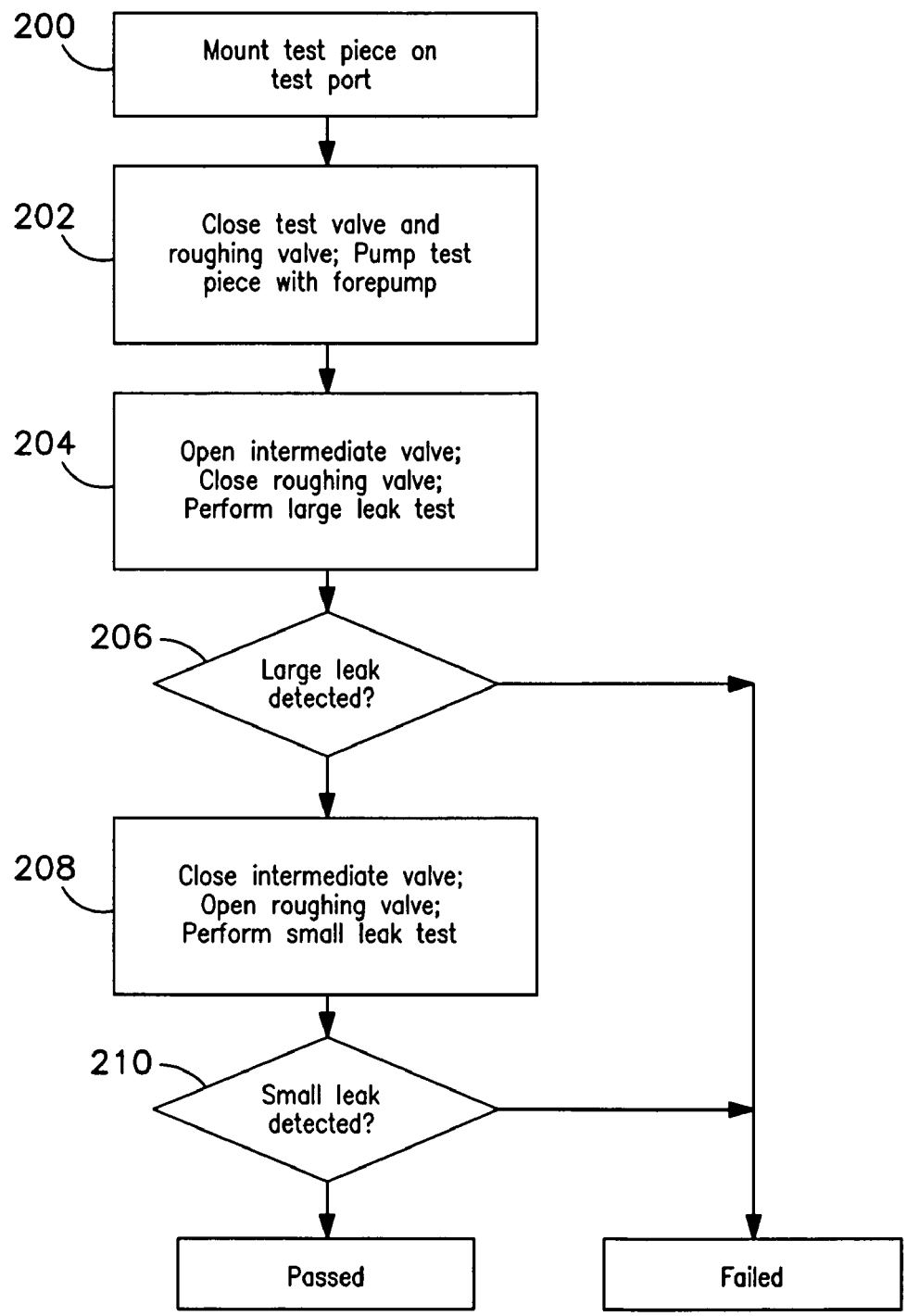
FIG. 4 is a flow chart that illustrates operation of the trace gas leak detector of FIG. 1.

Operation of the leak detector shown in FIG. 1 is described with reference to the flow chart of FIG. 4. In step 200, test piece 10 (FIG. 1) is mounted on the test port of the leak detector. More particularly, test piece 10 is mounted on inlet flange 14. In step 202, test valve 16 and roughing valve 22 are opened, and test piece 10 is vacuum pumped with forepump 30, typically beginning from atmospheric pressure. In step 204, roughing valve 22 is closed and intermediate valve 62 is opened, thus introducing a test sample from test piece 10 into the intermediate inlet 60 of forepump 30. Helium in the test sample diffuses in a reverse direction from intermediate inlet 60 to main inlet 24 of forepump 30 and then in a reverse direction through high vacuum pump 40 to mass spectrometer 42. This mode permits test line 20 to operate at the pressure of intermediate inlet 60 of forepump 30. This pressure is higher than the pressure at foreline 46 of high vacuum pump 40. In step 206, a determination is made by mass spectrometer 42 as to whether test piece 10 has a large leak, based on the amount of helium received through intermediate inlet 60. If a large leak is detected, the test piece 10 is classified as having failed the test and the test is terminated.

As discussed above, the forepump 30 may include more than one intermediate inlet. In one embodiment, the intermediate inlet that is best matched to the pressure of the test line 20 is selected for the large leak test. In another embodiment, the intermediate inlets are used in succession to perform a large leak test and one or more intermediate leak tests. In each embodiment, the intermediate valve coupled to the selected intermediate inlet is opened to perform a leak test.

If a large leak is not detected in step 206, the leak detector is configured for small leak detection. In step 208, intermediate valve 62 is closed and roughing valve 22 is opened for small leak detection. In this mode, helium in test line 20 passes through high vacuum pump 40 in the reverse direction from foreline 46 to mass spectrometer 42. This mode permits the test line 20 to operate at the foreline pressure of high vacuum pump 40. In step 210, a determination is made as to whether test piece 10 has a small leak. The detection of a small leak is based on the amount of helium that passes from test line 20 through high vacuum pump 40 to mass spectrometer 42. If a small leak is detected in step 210, the test piece is classified as having a leak and fails the test. If a leak is not detected in step 210, the test piece passes the leak test.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A trace gas leak detector comprising:
a test port to receive a sample containing a trace gas, the test port connected to a test line;
a mass spectrometer to detect the trace gas, the mass spectrometer having an inlet;
a high vacuum pump having an inlet port coupled to the inlet of the mass spectrometer, the high vacuum pump having an exhaust port; and
a forepump having a main inlet, at least one intermediate inlet connected to a working volume of the forepump, and an exhaust, the main inlet coupled to the exhaust port of the high vacuum pump, the intermediate inlet controllably connected to the test line, wherein the intermediate inlet operates at an intermediate pressure and wherein the forepump is of a type that permits location of the intermediate inlet at a range of intermediate pressures between the main inlet and the exhaust, a location of the intermediate inlet and the corresponding intermediate pressure being selectable according to an expected test line pressure in a particular application, the forepump selected from the group consisting of a scroll vacuum pump and a screw vacuum pump.

2. The trace gas leak detector as defined in claim 1, further comprising an intermediate valve coupled between the test line and the intermediate inlet of the forepump, and a controller to control operation of the intermediate valve in accordance with a selected operating mode.

3. The trace gas leak detector as defined in claim 1, wherein the forepump includes two or more intermediate inlets, further comprising an intermediate valve coupled between each of the intermediate inlets and the test line, and a controller to control operation of the intermediate valves in accordance with a selected operating mode.

4. The trace gas leak detector as defined in claim 1, wherein the mass spectrometer is configured to detect helium as the trace gas.

5. The trace gas leak detector as defined in claim 1, wherein the high vacuum pump comprises a turbomolecular pump.

6. The trace gas leak detector as defined in claim 1, wherein the high vacuum pump comprises a hybrid pump including one or more axial flow stages and one or more molecular drag stages.

7. The trace gas leak detector as defined in claim 1, wherein the high vacuum pump comprises a molecular drag pump.

8. The trace gas leak detector as defined in claim 1, wherein the high vacuum pump comprises a diffusion pump.

9. The trace gas leak detector as defined in claim 1, further comprising:
an intermediate valve coupled between the test line and the intermediate inlet of the forepump;
a roughing valve coupled between the test line and the main inlet of the forepump; and
a controller to open the intermediate valve during a large leak test and to open the roughing valve during a small leak test.

10. A trace gas leak detector comprising:
a test port to receive a sample containing a trace gas, the test port connected to a test line;
a mass spectrometer to detect the trace gas, the mass spectrometer having an inlet;
a high vacuum pump having an inlet port coupled to the inlet of the mass spectrometer, the high vacuum pump having an exhaust port; and
a forepump having a main inlet, at least one intermediate inlet connected to a working volume of the forepump, and an exhaust, the main inlet coupled to the exhaust port of the high vacuum pump, the intermediate inlet controllably connected to the test line, wherein the intermediate inlet operates at an intermediate pressure and wherein the forepump is of a type that permits location of the intermediate inlet at a range of intermediate pressures between the main inlet and the exhaust, a location of the intermediate inlet and the corresponding intermediate pressure being selectable according to an expected test line pressure in a particular application.

11. The trace gas leak detector as defined in claim 10, further comprising an intermediate valve coupled between the test line and the intermediate inlet of the forepump, and a controller to control operation of the intermediate valve in accordance with a selected operating mode.

12. The trace gas leak detector as defined in claim 10, wherein the forepump is selected from the group consisting of a scroll vacuum pump and a screw vacuum pump.

13. The trace gas leak detector as defined in claim 10, further comprising:
   an intermediate valve coupled between the test line and the intermediate inlet of the forepump;
   a roughing valve coupled between the test line and the main inlet of the forepump; and
   a controller to close the intermediate valve in a large leak test and to close the roughing valve in a small leak test.

14. A method for trace gas leak detection comprising:
   providing a mass spectrometer to detect the trace gas, the mass spectrometer having an inlet, and a high vacuum pump having an inlet port coupled to the inlet of the mass spectrometer, the high vacuum pump having an exhaust port;
   providing a forepump having a main inlet, at least one intermediate inlet connected to a working volume of the forepump, and an exhaust, wherein the intermediate inlet operates at an intermediate pressure and wherein the forepump is of a type that permits location of the intermediate inlet at a range of intermediate pressures between the main inlet and the exhaust, a location of the intermediate inlet and the corresponding intermediate pressure being selectable according to an expected test line pressure in a particular application, the forepump selected from the group consisting of a scroll vacuum pump and a screw vacuum pump;
   coupling the main inlet of the forepump to the exhaust port of the high vacuum pump; and
   performing a large leak test by supplying a sample containing the trace gas to the intermediate inlet of the forepump, wherein the trace gas moves in reverse direction through the forepump and the high vacuum pump and is detected by the mass spectrometer.

15. The method as defined in claim 14, further comprising providing a forepump having two or more intermediate inlets and connecting one of the intermediate inlets to the test line in accordance with a selected operating mode.

16. The method as defined in claim 14, further comprising performing a small leak test by supplying a sample containing the trace gas to the main inlet of the forepump.

17. The method as defined in claim 14, wherein the sample containing the trace gas is received through a test port and a test line, further comprising vacuum pumping the test line with the forepump prior to supplying a sample containing the trace gas to the intermediate inlet of the forepump.

* * * * *